(12) United States Patent
Marche

(10) Patent No.: US 7,811,023 B2
(45) Date of Patent: *Oct. 12, 2010

(54) ARTICULATED JUNCTION DEVICE

(75) Inventor: Hervé Marche, Roquettes (FR)

(73) Assignee: Airbus France, Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/783,585

(22) Filed: Feb. 19, 2004

(65) Prior Publication Data

US 2004/0165939 A1 Aug. 26, 2004

(30) Foreign Application Priority Data

Feb. 26, 2003 (FR) .................................. 03 02340

(51) Int. Cl.
*F16C 11/06* (2006.01)

(52) U.S. Cl. ................. 403/150; 403/154; 403/157; 403/DIG. 8

(58) Field of Classification Search ............. 403/55, 403/57, 58, 150, 151, 154, 157, 159, DIG. 8, 403/4; 244/54; 248/555; 280/86.753; 411/398
See application file for complete search history.

(56) References Cited

U.S. PATENT DOCUMENTS

| | | | | |
|---|---|---|---|---|
| 1,044,055 A * | 11/1912 | Johnson | ........................ | 403/107 |
| 1,478,052 A * | 12/1923 | Oliver | ........................ | 384/255 |
| 1,900,081 A * | 3/1933 | Swerer | ........................ | 16/242 |
| 2,102,420 A * | 12/1937 | Kogstrom | ........................ | 403/156 |
| 2,180,046 A * | 11/1939 | Gleissner | ........................ | 384/255 |
| 2,890,893 A * | 6/1959 | Laukhuff | ........................ | 403/54 |
| 3,006,443 A * | 10/1961 | Siler | ........................ | 403/408.1 |
| 3,077,960 A * | 2/1963 | Lang | ........................ | 403/4 |
| 3,145,021 A | 8/1964 | Anderson | ........................ | 268/65 |
| 3,441,299 A * | 4/1969 | Pfaar | ........................ | 403/131 |
| 3,526,413 A * | 9/1970 | Muller | ........................ | 403/119 |
| 3,529,790 A * | 9/1970 | Buch | ........................ | 244/48 |
| 3,567,262 A * | 3/1971 | Szkaradek et al. | ........................ | 403/56 |
| 3,590,461 A * | 7/1971 | Siler | ........................ | 29/240 |
| 3,880,444 A * | 4/1975 | Bridges | ........................ | 280/86.753 |
| 4,013,307 A * | 3/1977 | Dowd et al. | ........................ | 280/764.1 |
| 4,026,572 A * | 5/1977 | Yoshioka | ........................ | 280/276 |
| 4,225,264 A * | 9/1980 | Coone | ........................ | 403/337 |
| 4,424,984 A * | 1/1984 | Shiratori et al. | ........................ | 280/86.753 |
| 4,444,365 A * | 4/1984 | Heuberger | ........................ | 403/DIG. 7 |
| 4,726,603 A * | 2/1988 | Sugiyama et al. | | |
| 4,736,964 A * | 4/1988 | Specktor | | |
| 4,813,163 A * | 3/1989 | Livingston et al. | ........................ | 403/13 |
| 4,948,185 A | 8/1990 | Miller | ........................ | 292/256.5 |

(Continued)

FOREIGN PATENT DOCUMENTS

CA 2446214 A1 * 9/2003

(Continued)

*Primary Examiner*—Victor MacArthur
(74) *Attorney, Agent, or Firm*—Nixon Peabody LLP

(57) ABSTRACT

An articulated junction device between a suspended structure and a load bearing structure comprises a hinge pin, at least one first part being installed in the suspended structure so as to be able to rotate about a first axis and a second part installed in the load bearing structure so as to be able to rotate about a second axis. The hinge pin passes through the first part and the second part. The first axis and the second axis are parallel to each other and offset from each other.

3 Claims, 3 Drawing Sheets

U.S. PATENT DOCUMENTS

| | | | | |
|---|---|---|---|---|
| 5,016,906 A | * | 5/1991 | Cadden | 280/680 |
| 5,052,711 A | * | 10/1991 | Pirkey et al. | 280/86.753 |
| 5,104,061 A | * | 4/1992 | Doane | 74/570.1 |
| 5,316,332 A | * | 5/1994 | Ingalls | 280/86.756 |
| RE34,659 E | * | 7/1994 | Reilly | 403/162 |
| 5,580,201 A | * | 12/1996 | Brilmyer | 411/354 |
| 5,779,260 A | * | 7/1998 | Reilly et al. | 403/4 |
| 6,027,129 A | * | 2/2000 | Kleinschmit et al. | 280/86.754 |
| 6,113,299 A | * | 9/2000 | Reichelt et al. | 403/168 |
| 6,350,074 B1 | * | 2/2002 | Borges et al. | 403/79 |
| 6,484,363 B1 | * | 11/2002 | Chung | 16/242 |
| 6,688,616 B1 | * | 2/2004 | Ziech | 280/86.751 |
| 6,688,629 B2 | * | 2/2004 | Essinger | 280/291 |
| 6,938,855 B2 | * | 9/2005 | Marche | 248/556 |

FOREIGN PATENT DOCUMENTS

| | | | |
|---|---|---|---|
| DE | 3131107 A1 | * | 12/1982 |
| DE | 3504921 A1 | * | 8/1986 |
| DE | 3729102 A1 | * | 4/1988 |
| DE | 10018763 A1 | * | 10/2001 |
| EP | 16270 A1 | * | 10/1980 |
| EP | 0 397 966 | | 1/1990 |
| FR | 2 795 783 | | 1/2001 |
| FR | 2836672 A1 | * | 9/2003 |
| GB | 1 250 685 | | 10/1971 |
| JP | 01269762 | | 10/1989 |
| WO | WO 9518033 A1 | * | 7/1995 |

* cited by examiner

ARTICULATED JUNCTION DEVICE

CROSS-REFERENCE TO RELATED APPLICATION

This application claims priority to French Application No. 03 02340, filed on Feb. 26, 2003, entitled: "Articulated Junction Device" and was not published in English.

DESCRIPTION

1. Technical Domain

This invention relates to a compact articulated junction device, particularly designed to be inserted between a load bearing structure and a suspended structure.

2. State of Prior Art

It is known that a shackle can be used to connect a suspended structure to a load bearing structure.

In this case, the load bearing structure then comprises a clevis that projects downwards and on which the top part of the shackle is articulated through a first hinge pin. The bottom end of the shackle is articulated to a clevis attached to the suspended structure through a second hinge pin. This second clevis then projects upwards or sideways from the suspended structure.

This arrangement has the disadvantage that it is large in the vertical direction due to the presence of the shackle connecting the devises that project upwards or sideways on the suspended structure and downwards below the load bearing structure.

PRESENTATION OF THE INVENTION

The specific purpose of the invention is to propose a new junction device compact in a vertical direction that could be used to replace a traditional shackle for attaching a suspended structure under a load bearing structure and transmitting loads that are acceptable compared with loads transmitted by shackles used on existing devices.

This objective is achieved, at least partly, according to the invention through the use of an articulated junction device between a suspended structure and a load bearing structure, the device being characterized in that it comprises a hinge pin, at least one first part being installed in the suspended structure so as to be able to rotate about a first axis and a second part installed in the load bearing structure so as to be able to rotate about a second axis, the hinge pin passing through the first part and the second part, the first axis and the second axis being parallel to each other and offset from each other.

This arrangement conforms with the invention provides a compact means of connecting a suspended structure to the load bearing structure.

In one preferred embodiment of the invention, rotation prevention means are provided between the hinge pin and each of the first and second parts, so as to prevent any rotation between them.

Advantageously, the suspended structure is in the form of a U-shaped clevis comprising two plates parallel to each other between which the load bearing structure is placed, a first part being fitted in each of the plates of the suspended structure.

In the latter case, each of the two first parts is preferably installed in the corresponding one of the two plates of the suspended structure. These first parts then cooperate with the two plates in the suspended structure through surfaces in the form of portions of spheres together defining a ball joint type connection between the plates and the said parts.

Intermediate parts forming ball joint cages can then be fixed in each of the two plates of the suspended structure. These intermediate parts cooperate through internal surfaces in the form of portions of spheres with external surfaces of the first parts, in the form of portions of spheres.

BRIEF DESCRIPTION OF THE DRAWINGS

We will now present one preferred embodiment of the invention as a non-limitative example, with reference to the attached drawings, in which.

DETAILED PRESENTATION OF A PARTICULAR EMBODIMENT

Figure 1:
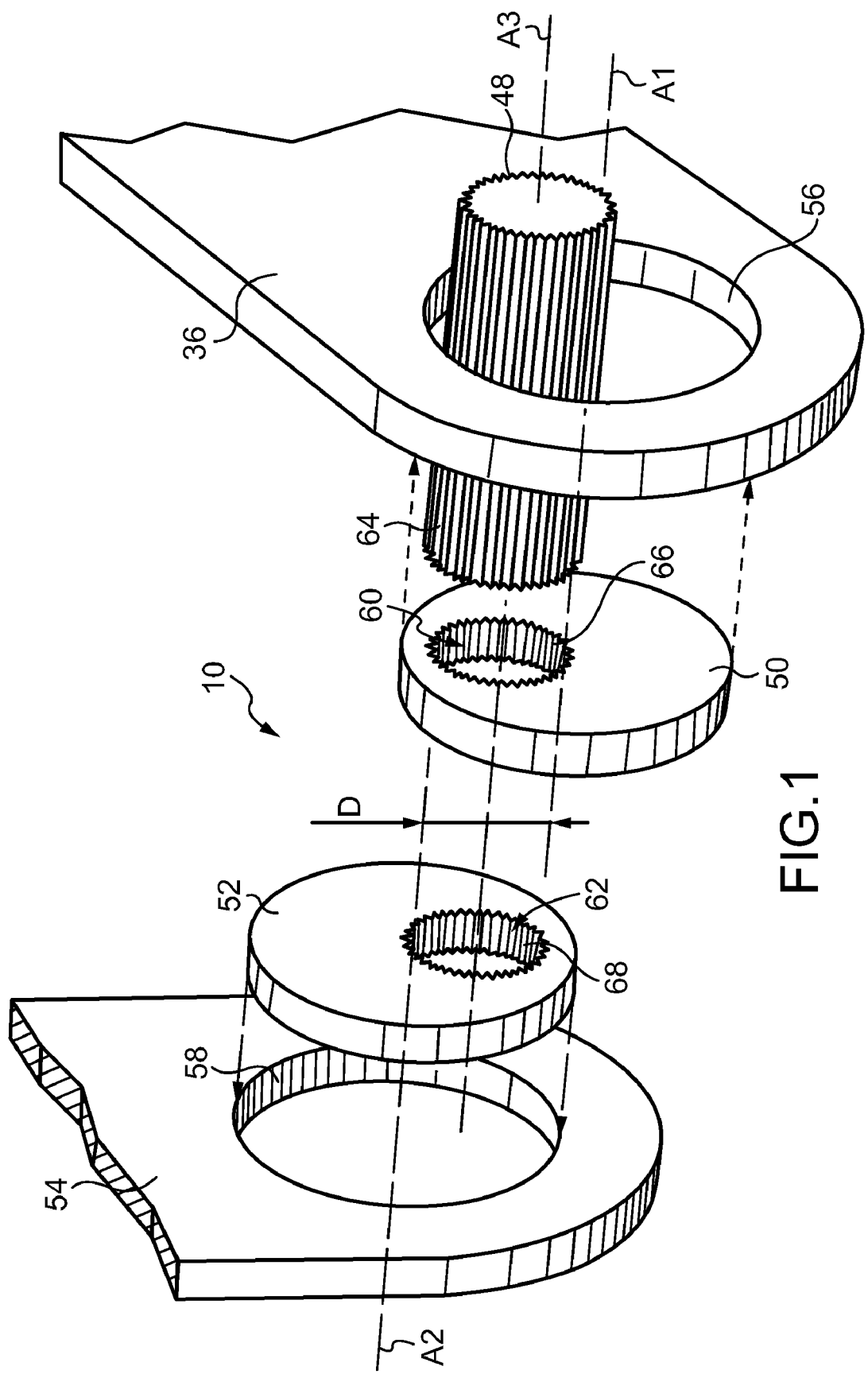
FIG. 1 is an exploded perspective view that illustrates a preferred embodiment of the compact junction device according to the invention.

In the preferred embodiment of the invention illustrated in FIG. 1, an articulated junction device 10 is used to connect a suspended structure 36 to a load bearing structure 54 leaving it free to pivot.

In the embodiment of the invention shown in FIG. 1, the articulated junction device 10 comprises a single hinge pin 48, a first disk shaped part 50 and a second disk shaped part 52, usually identical to the first part.

More precisely, the first disk shaped part 50 is installed in a cylindrical hole 56 passing through the suspended structure 36 along a first axis A1, such that the first part 50 can rotate freely about this first axis.

Similarly, the second disk shaped part 52 is installed in a cylindrical hole 58 that passes through the load bearing structure 54 along a second axis A2, such that the second part 52 can rotate freely about this second axis.

The second axis A2 is parallel to the first axis A1. Furthermore, the second axis A2 is offset vertically upwards from the first axis A1 by a distance D that could be slightly greater than or approximately equal to or even less than the diameter of the hinge pin 48.

The diameter of the hinge pin 48 is significantly less than the diameter of parts 50 and 52. It passes through the cylindrical holes 60 and 62 machined in the first disk shaped part 50 and the second disk shaped part 52 respectively. More precisely, the axis A3 common to the cylindrical holes 60 and 62 and to the hinge pin 48 is offset from the corresponding axes A1 and A2 in the parts 50 and 52.

The arrangement that has just been described with reference to FIG. 1 provides a means of reducing the height of the junction device to make it shorter than a conventional shackle.

Preferably, and as shown diagrammatically in FIG. 1, rotation prevention means are provided between the hinge pin 48 and each of the disk shaped parts 50 and 52. These rotation prevention means may for example comprise teeth or splines 64 formed on the peripheral surface of the hinge pin 48, engaged on complementary teeth or splines 66 and 68 formed in the cylindrical holes 60 and 62 respectively.

This arrangement eliminates one degree of freedom in the resulting connection between the suspended structure 36 and the load bearing structure 54.

Figure 2:
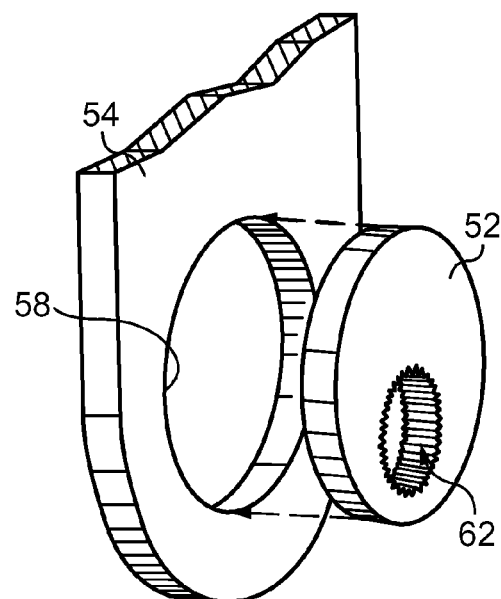
FIG. 2 is an exploded perspective view that illustrates an improvement to the embodiment of the junction device according to the invention illustrated in FIG. 1.
Figure 2:
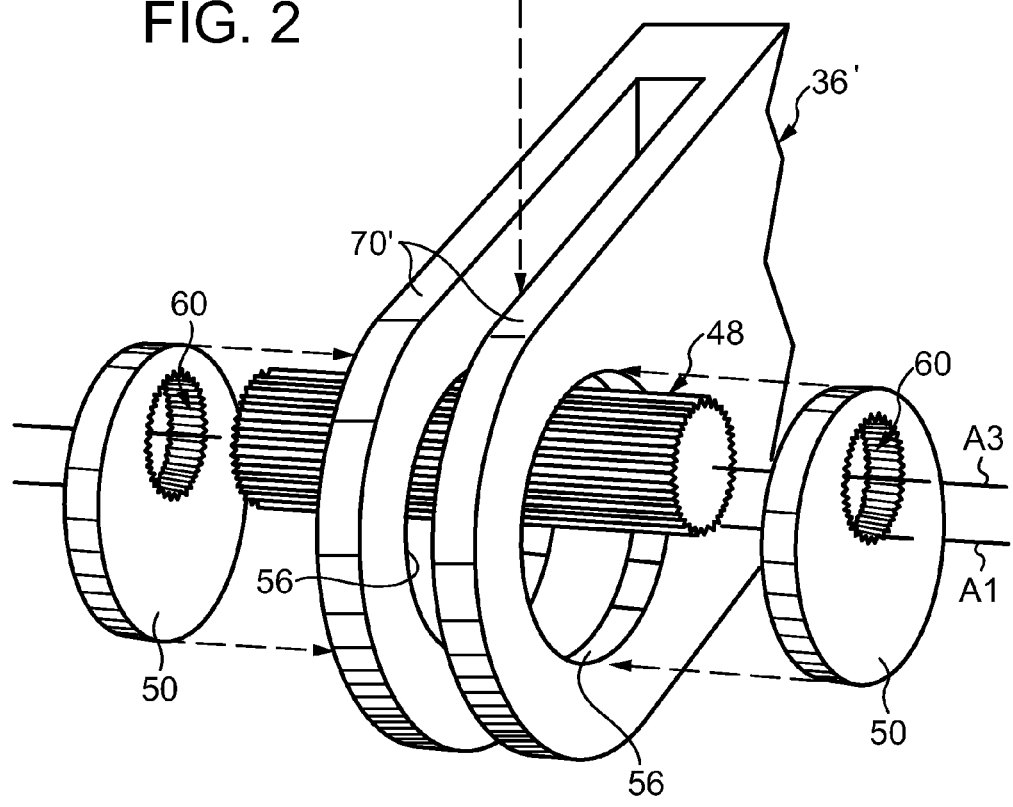

FIG. 2 illustrates a variant of the embodiment illustrated in FIG. 1, in which the suspended structure 36' is in the form of a U-shaped clevis. More precisely, the suspended structure 36' illustrated in FIG. 2 comprises two flat plates 70 parallel to each other. In this case, a cylindrical hole 56 is machined in each of the plates 70, such that the two holes 56 are centered on the same hinge pin A1.

A disk shaped part 50 is then placed in each of the cylindrical holes 56, through which a cylindrical hole 60 passes with the same diameter as the hinge pin 48.

In this case, the tab materializing the load bearing structure 54 is placed between the parallel plates 70" of the suspended structure 36', with the disk shaped part 52 that fits free to rotate in the cylindrical hole 58, as in the embodiment shown in FIG. 1.

The hinge pin 48 then simultaneously passes through each of the cylindrical holes 60 and 62 formed in the two disk shaped parts 50 and the disk shaped part 52 respectively. The hinge pin 48 thus forms the connection between the suspended structure 36 and the load bearing structure 54. In particular, this connection may be held in place by end plates, nuts, etc., located at the ends of the hinge pin 48.

As in the embodiment in FIG. 1, rotation prevention means such as splines may be provided between the hinge pin 48 and the cylindrical holes 60 and 62 in which this hinge pin is fitted. The result is that one degree of freedom is eliminated in the connection between the suspended structure 36 and the load bearing structure 54.

Figure 3:
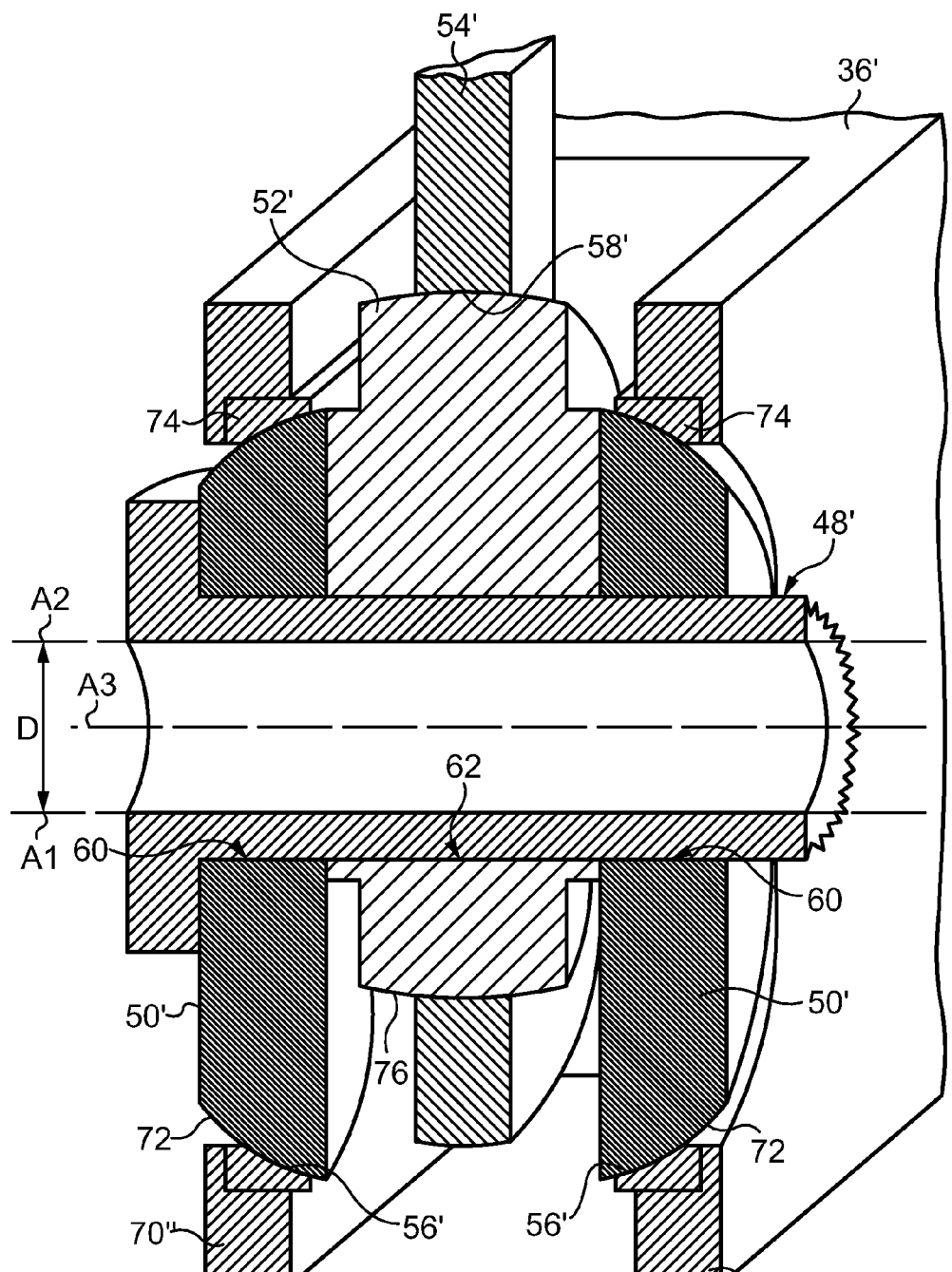
FIG. 3 is a perspective view that represents a variant of the improvement illustrated in FIG. 2.

FIG. 3 shows an improvement to the variant embodiment that has just been described with reference to FIG. 2.

In this case, a ball joint function is added to the junction device by which the suspended structure 36 is connected to the load bearing structure 54'.

More precisely, each of the disk shaped parts 50 installed in the plates 70 of the suspended structure 36' has a peripheral surface 72 in the form of a portion of a sphere. Intermediate parts 74 forming ball joint cages are installed in each of the plates 70, to define internal surfaces 56' in the form of portions of spheres. These internal surfaces are complementary to peripheral surfaces 72 of disk shaped parts 50 and have a common center of rotation. Thus, when these disk-shaped parts 50 fit into intermediate parts 74, they form a ball joint type connection between the hinge pin 48 and the suspended structure 36'.

Similarly, the disk shaped part 52' has an external peripheral surface 76 in the form of a portion of a sphere, complementary to an internal surface 58' of the load bearing structure 54' in the form of a portion of a sphere. Thus, when the disk shaped part 52' fits into the load bearing structure 54', the complementary surfaces 76 and 58' connect the hinge pin 48 and the load bearing structure 54' through a ball joint type connection.

As illustrated in FIG. 3, the centers of the two ball joint type connections thus formed are offset from each other by a distance D along a vertical direction. This distance D is the same as in the embodiment in FIG. 1 described above.

Only one degree of freedom of the junction device 10 is fixed in the improvement described above with reference to FIG. 3. The device according to the invention is more compact and also lighter in weight than a conventional "shackle" type device.

The invention claimed is:

1. An assembly comprising:
a load bearing structure having a first circular member rotatable about a first axis along a first horizontal axis, the first circular member having a first aperture;
a suspended structure having a second circular member rotatable about a second axis along a second horizontal axis, the second circular member having a second aperture, the suspended structure including two plates parallel to each other and configured to receive the load bearing structure therebetween, wherein each of the two plates of the suspended structure cooperate with the load bearing structure through spherical surfaces together defining a ball joint connection therebetween; and
a coupling member received in said first and second apertures to couple the suspended structure to the load bearing structure with the first axis adjacent to the second axis, the coupling member being oriented along a third axis parallel and adjacent to the first axis and the second axis, wherein the first and second circular members are unable to rotate with respect to one another about the third axis via a rotation prevention means and the second axis is offset vertically upwards from the first axis.

2. An assembly comprising:
a load bearing structure having a first circular member rotatable about a horizontally oriented first axis, the first circular member having a first aperture;
a suspended structure comprising two plates parallel to each other between which the load bearing structure is placed, each of the two plates of the suspended structure having a second circular member rotatable about a common horizontally oriented second axis, and each of the second circular members having a second aperture;
a coupling member received in said first and second apertures to couple the suspended structure to the load bearing structure with the first axis adjacent to the second axis, the coupling member being oriented along a third axis parallel and adjacent to the first axis and the second axis, wherein the first and second circular members are unable to rotate with respect to one another about the third axis and the second axis is offset vertically upwards from the first axis;
rotation prevention means provided between the coupling member and each of the first and second circular members, said rotation prevention means being configured to prevent any relative rotation therebetween; and
intermediate parts forming ball joint cages fixed in each of the two plates of the suspended structure, second spherical surfaces being formed between the ball joint cages and the second circular members.

3. An assembly comprising:
a load bearing structure having a first circular member rotatable about a horizontally oriented first axis, the first circular member having a first aperture;
a suspended structure comprising two plates parallel to each other between which the load bearing structure is placed, each of the two plates of the suspended structure having a second circular member rotatable about a common horizontally oriented second axis, and each of the second circular members having a second aperture;
a coupling member received in said first and second apertures to couple the suspended structure to the load bearing structure with the first axis adjacent to the second axis, the coupling member being oriented along a third axis parallel and adjacent to the first axis and the second axis, wherein the first and second circular members are unable to rotate with respect to one another about the third axis and the second axis is offset vertically upwards from the first axis; and
rotation prevention means provided between the coupling member and each of the first and second circular members, said rotation prevention means being configured to prevent any relative rotation therebetween, wherein first spherical surfaces are formed between the load bearing structure and the first circular member, said first spherical surfaces defining a first ball joint connection between the load bearing structure and the complying member, and second spherical surfaces are formed between the second circular members and the two plates of the suspended structure, said second spherical surfaces defining a second ball joint connection between the suspended structure and the complying member.

* * * * *